United States Patent
Condon

[11] 3,836,809
[45] Sept. 17, 1974

[54] FIBER OPTIC PLATE WITH DENSE OPAL GLASS CLADDING

[75] Inventor: Edward U. Condon, Boulder, Colo.

[73] Assignee: Corning Glass Works, Corning, N.Y.

[22] Filed: July 19, 1971

[21] Appl. No.: 163,721

[52] U.S. Cl. ............. 313/465, 313/92 LF, 350/96 B
[51] Int. Cl..... H01j 29/12, G02b 5/16, C03c 13/00
[58] Field of Search ................................. 313/92 LF

[56] References Cited
UNITED STATES PATENTS

| | | | |
|---|---|---|---|
| 3,400,214 | 9/1968 | Hamann............................ | 313/92 R |
| 3,485,764 | 12/1969 | Kazan.......................... | 350/160 P X |
| 3,507,551 | 4/1970 | Stetten...................... | 313/92 LF |
| 3,519,742 | 7/1970 | Bjelland...................... | 350/160 P X |
| 3,543,074 | 11/1970 | Turner et al. .................... | 313/92 R |
| 3,607,322 | 9/1971 | Brady et al. ........................ | 106/50 |
| 3,660,706 | 5/1972 | Steinberg et al. ........... | 313/92 LF X |

FOREIGN PATENTS OR APPLICATIONS

| | | | |
|---|---|---|---|
| 950,906 | 2/1964 | Great Britain................. | 106/DIG. 6 |

*Primary Examiner*—Robert Segal
*Attorney, Agent, or Firm*—William J. Simmons, Jr.

[57] ABSTRACT

An image storage device is disclosed which consists of a multiplicity of light conducting fibers secured together in side-by-side relation to form a fiber optic plate. Each of the fibers comprises a photochromic glass core and a layer of dense opal glass disposed on the surface of the core, the index of refraction of the opal glass being lower than that of the core. In image storage devices of this type light which is incident on the core-cladding interface at an angle less than the critical angle passes into the cladding and may darken adjacent photochromic fibers. The opal glass functions to scatter light passing through the core-cladding interface and thereby reduce the amount of light leaking to adjacent fibers, some of the scattered light being returned to the photochromic core from which it originated and contributing to the darkening thereof.

8 Claims, 2 Drawing Figures

PATENTED SEP 17 1974 3,836,809

INVENTOR.
Edward U. Condon
BY William J. Simmons Jr
ATTORNEY

FIBER OPTIC PLATE WITH DENSE OPAL GLASS CLADDING

BACKGROUND OF THE INVENTION

The present invention relates to a photochromic fiber optic plate for use in image storage and display systems.

Optical image storage and display devices are known which utilize a sheet of normally transparent, photochromic material that is rendered opaque when subjected to ultraviolet light. The photochromic material is often disposed adjacent to the faceplate of a cathode ray tube (CRT) having a phosphor which generates ultraviolet light, a dichroic filter being disposed between the faceplate and photochromic material for reflecting visible light and transmitting ultraviolet light. Probing light directed toward the photochromic material is either absorbed thereby, or it is reflected by the dichroic filter, passes back through the transparent areas of the photochromic material and is displayed on a screen.

Since the useful lifetime of organic photochromic films is quite limited, it is preferable to utilize for the storage medium a plate of photochromic glass which may be subjected to actinic radiation indefinitely without fatigue. Moreover, since photochromic glass, unlike organic photochromic materials, does not outgas when it is disposed within a CRT, it can be employed as the target substrate onto which the CRT phosphor is applied, thus permitting the maximum transfer of radiated energy from the phosphor to the photochromic glass plate. However, photochromic glass does not have a sufficiently high density of darkening centers and therefore must be used in relatively large thicknesses in order to provide sufficient optical density to create a displayed image having adequate contrast. The radiation pattern from a conventional phosphor screen is nearly Lambertian; thus, as the radiated light from the phosphor penetrates such a relatively thick homogeneous sheet of photochromic glass, it spreads and causes a darkened image of poor resolution. A solution to this problem is disclosed in the publication entitled "A New Time-Sharing Terminal" by G. K. Megla and D. R. Steinberg, Information Display, Vol. 7, Part I — Sept./Oct. 1970, pp. 15–19 and 32 & Part II — Nov./Dec. 1970, pp. 31–33 and 54, wherein a cathode ray tube display system utilizes a photochromic fiber optic plate that is disposed adjacent to the inside surface of the CRT faceplate. In this system the target substrate is a fiber optic plate wherein each fiber has a photochromic glass core. Since that light from the phosphor which is within the acceptance angle of the fiber optic is trapped and confined to a few photochromic fiber cores, light spreading is reduced and the resolution of the resultant image is significantly better than that provided by a plate of bulk photochromic glass of equivalent optical density.

When the CRT phosphor is disposed on a photochromic fiber optic plate, the amount of light radiated by the phosphor that is trapped in a fiber core can be described by the acceptance efficiency of the fiber which is related to the numerical aperture or acceptance angle thereof. As is the case with conventional fiber optics, the efficiency of light collection of a photochromic fiber optic can be approximately characterized by its numerical aperture for meridional light rays, given by the equation $$N.A. = n_a \sin\theta = \sqrt{n_o^2 - n_c^2} \quad (1)$$

where $n_a$, $n_o$ and $n_c$ are the refractive indices of the medium exterior to the fiber optic, the core material, and the cladding material, respectively, and $\theta$ is the acceptance half-plane angle of the fiber optic. Since the spacial radiation from the phosphor screen can be approximated by the cosine distribution of a Lambertian source, the "acceptance efficiency" of the photochromic fiber optic can be defined as the ratio of the portion of light accepted by the fiber optic from a Lambertian source to the total radiated light from the Lambertian source and is given by the equation $$\eta_a = \frac{\frac{\pi R^3 \sin^2\theta}{3}}{\frac{\pi R^3}{3}} = \sin^2\theta \quad (2)$$

where $R$ is the radius of the polar radiation sphere of the Lambertian source. It can be assumed that the phosphor screen is not in optical contact with the photochromic fiber optic plate although the phosphor has a significant degree of optical contact with the plate. Therefore, $n_a$ can be set equal to 1 and the substitution of Equation (1) into Equation (2) gives the following equation $n_a = n_o^2 - n_c^2$ (3)

Core and cladding refractive indices for a typical photochromic fiber optic are $n_o = 1.63$ and $n_c = 1.53$. Substitution of these quantities in Equation (3) gives an acceptance efficiency of slightly better than 30 percent for these conventional materials. This corresponds to a numerical aperture of 0.56 and an acceptance half-plane angle of 34°. Thus, most of the light radiated by the phosphor is not trapped by the photochromic core; rather, it may be directed laterally and not enter the photochromic fiber optic plate, it may enter the fiber cladding or it may enter the core at angles greater than the acceptance angle and be refracted into adjacent cores, thereby reducing the resolution of an image projected from such plate. The amount of "cross-talk," i.e., phosphor radiated light that enters one fiber and passes into adjacent fibers, must be reduced if an image storage system is to provide an image of acceptable quality.

Attempts have been made to reduce cross-talk by cladding the photochromic fibers with an ultraviolet absorbing glass. However, due to space limitations, this cladding should not be much more than two microns thick. It is difficult to get much absorption in such a short light path. Moreover, that light which is absorbed is not available to darken the photochromic glass core of the fiber which it initially entered.

Another method of reducing cross-talk utilizes fiber optic devices which comprise a bundle of fibers of highly light-transmissive material in which there is dispersed a number of elements of material having significant light-absorbing properties. Fiber optic image-transfer devices of this type are disclosed in U.S. Pat. No. 3,397,022 issued Aug. 13, 1968 to H.B. Cole. Due to the random disposition of such light absorbing elements throughout the fiber optic image-transfer device, only some of the light passing through the core-cladding interfaces of the fibers can be absorbed. In addition to the aforementioned deficiency, some of the devices taught in that patent are relatively difficult to construct since they include multi-core optical fibers.

SUMMARY OF THE INVENTION

It is therefore an object of the present invention to provide an image storage fiber optic plate of such a construction that cross-talk between fibers is reduced due to an increase in inter-fiber optical isolation. Another object of the present invention is to provide a photochromic fiber optic image storage device capable of storing and displaying improved images.

Briefly, the image storage device of the present invention comprises a multiplicity of light conducting fibers secured together in side-by-side relation to form a fiber optic plate, corresponding ends of the fibers cooperating to define first and second end faces. Each of the fibers comprises a glass core having a given index of refraction and cladding means consisting of a light-scattering material having a refractive index lower than that of the core disposed upon the surface of the core. The cladding means forms with the core an interface of such a character that light from the core impinging upon the interface at angles greater than the critical angle produces a component of specular reflection and a component resulting in the scattering of light into the core at all directions. Light from the core impinging upon the interface at angles less than the critical angle results in a scattered light component whereby light is redirected into the core at all angles.

DETAILED DESCRIPTION

Figure 1:
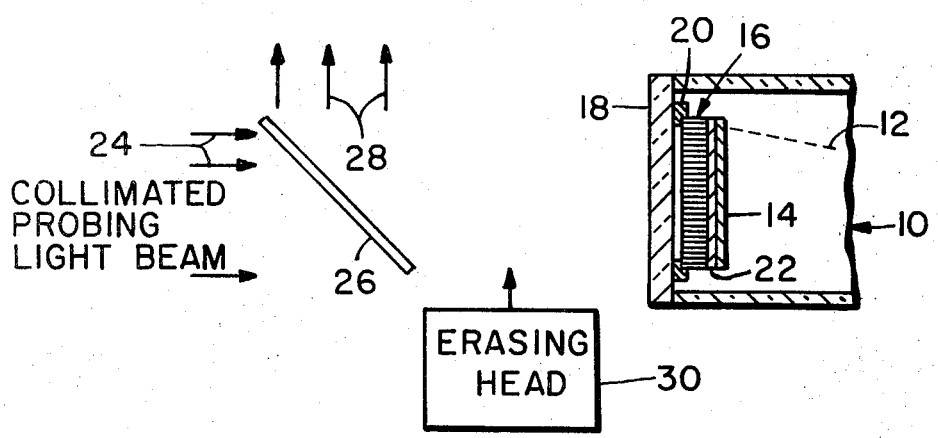
FIG. 1 is a diagrammatic view of an image storage system embodying a photochromic fiber optic plate made in accordance with the present invention.

FIG. 1 illustrates an image storage and display device suitable for incorporating the improved photochromic fiber optic plate of the present invention and is similar to the system described in the aforementioned Megla et al. publication. Cathode ray tube 10 has an electron beam 12 which, by conventional techniques, scans a phosphor layer 14 while its amplitude is modulated in accordance with information to be displayed. A photochromic fiber optic plate 16 is disposed a small distance from faceplate 18 by supports 20. Plate 16 comprises a plurality of photochromic glass containing fibers which will be hereinafter described. Disposed between phosphor layer 14 and plate 16 is a coating 22 of dichroic filter material which may be formed on plate 16 by an evaporating technique. Dichroic coating 22 is typically a multilayered film which is so constructed that it passes ultraviolet light and reflects green light.

Ultraviolet light, which is generated by electron beam 12 penetrating phosphor layer 14, passes through dichroic coating 22 and darkens selected ones of the photochromic glass cores, thereby storing an image in plate 16 which is determined by those of the photochromic cores which have been darkened. Information is read out of plate 16 by projecting a collimated beam of green probing light represented by arrows 24 through beam splitter 26 and faceplate 18 and into the fibers of plate 16.

The probing light is reflected from dichroic layer 22 and passes back through the fibers of the plate 16, portions of the probing light beam being attenuated by passing twice through those fibers which have been darkened by ultraviolet light generated by phosphor layer 14. The image containing light beam represented by arrows 28 is reflected by beam splitter 26 to an optical system (not shown) whereby an image may be directly viewed or projected.

Information can be erased from the photochromic fiber optic plate by temporarily disposing in front of the faceplate 18 an erasing head 30 which is an optical cavity containing quartz iodide lamps and a red filter. Both red and infrared light emitted by the erasing head bleach or erase the information stored in the photochromic fiber optic plate. Alternatively, if the cathode ray tube is employed in a constantly varying display system such as a plan position indicator, a photochromic glass having a relatively high normal fade rate may be employed. In such a system, the collimated probing light beam 24 may contain some bleaching light in addition to the neutral green light and erasing head 30 may be omitted.

Heretofore, photochromic fiber optic plates have usually consisted of a multiplicity of fibers secured together in side-by-side relation, each fiber comprising a core of photochromic glass surrounded by a layer of transparent or ultraviolet absorbing cladding material. In accordance with the present invention the cladding material consists of a light scattering material which forms with the core a light scattering interface of such a character that light from the core incident upon the interface at angles greater than the critical angle produces a component of specular reflection and a component resulting in the scattering of light into the core at all directions. Light from the core which impinges upon the core-cladding interface at angles less than the critical angle results in a scattered light component whereby light is redirected at all angles into the core, the remaining light being absorbed by the cladding material or passing into adjacent fibers. In the preferred embodiment illustrated in FIG. 2, plate 16 comprises a plurality of fibers secured together in side-by-side relation so that corresponding opposite ends of the fibers cooperate to define opposing faces 34 and 36. Each fiber consists of a core 38 of photochromic glass of relatively high index of refraction surrounded by a layer 40 of dense opal cladding glass of relatively low index of refraction.

U.S. Pat. No. 3,208,860 constitutes a basic disclosure relative to photochromic glasses. That patent describes, in particular, inorganic silicate glasses containing submicroscopic crystals of the silver halides, viz., silver chloride, silver bromide, and silver iodide, which become darker in color when the glass is subjected to actinic radiation but which regain their original color when the actinic radiation is removed and/or the glass is exposed to radiations of different wavelengths. Photochromic glass usually becomes darkened or activated by exposure to ultraviolet radiation, and the darkened areas can be bleached or erased by red or infrared radiation. The information contained in the glass persists therein for reasonable times while the glass is being read by passing therethrough radiation of a neutral wavelength which is usually green light. A photochromic fiber optic plate is described in copending patent application Ser. No. 801,562 filed Feb. 24, 1969 in the name of R. J. Araujo, commonly assigned herewith. That application teaches a family of photochromic glasses exhibiting a refractive index sufficiently greater than 1.52 to be effective as a core element in an optical fiber.

In addition to possessing a relatively low refractive index, a cladding glass should be compatible with the core glass. Generally, the thermal coefficient of expansion of the cladding glass is important since a bad mismatch of the expansion coefficients of the core and cladding often leads to poor bonding and crazing of the cladding during fiber manufacture.

Layer 40 consists of a dense opal glass which has a low index of refraction relative to that of core 38 and which may contain some ultraviolet absorbing constituent. Opal glasses owe their translucent character to the multiple scattering of light inside the glass. Such glasses are obtained by the precipitation of crystals with an index of refraction different from that of the base glass, the degree of opacity being determined by the difference in refractive index between glass and crystal, and by the number and size of the crystals. Since the latter two parameters involve nucleation and crystal growth, the transmission of opal glasses can be controlled. Most of these glasses depend upon some constituent such as a fluoride or a phosphate which causes small particles to crystallize as the glass is cooled. Fluorides may be added to the composition in concentrations from about 5 to 15 percent. The term "dense opal glass" as used herein means an opal glass which has a relatively low transmittance and which has a reflectance characteristic similar to that of glass B, FIG. 2–26 of the publication "Glass Engineering Handbook" by E. B. Shand, MacGraw-Hill Book Company, Inc., 1958.

As previously stated, it may be desirable to include some ultraviolet absorbing constituent in the cladding glass. Ultraviolet absorption can be obtained by adding titanium oxide, cerium oxide or the like to the batch, the overall batch composition containing, in weight percent on the oxide basis as calculated from the batch, up to about 10 percent of either or both of these additional oxides.

An opal glass suitable for use as layer 40 may be obtained by melting a batch consisting essentially, in parts by weight, as calculated from the batch, of 66 parts $SiO_2$, seven parts $Al_2O_3$, 10 parts $B_2O_3$, 7.5 parts $Na_2O$, 1.5 parts $Li_2O$, 0.5 parts $Cs_2O$, 7.5 parts $CeO_2$, 15 parts F, and 0.2 parts $Sb_2O_3$.

Figure 2:
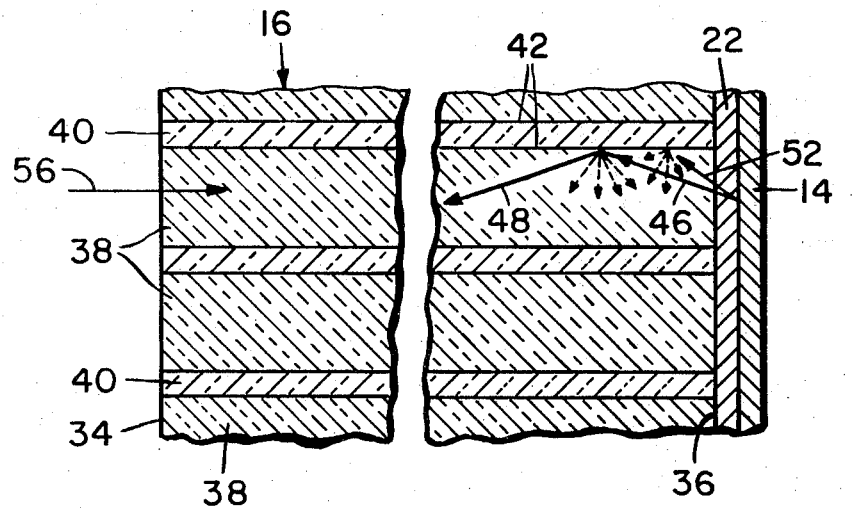
FIG. 2 is an enlarged vertical sectional view of a portion of a fiber optic image storage plate which may be utilized in the image storage system of FIG. 1.

The fiber optic plate illustrated in FIG. 2 becomes activated in the following manner. Some of the light rays such as ray 46 which are generated by phosphor layer 14 are within the acceptance angle of the fibers and are incident on the interface 42 at an angle greater than the critical angle. The light reflecting from interface 42 is illustrated as consisting of a component 48 of specular reflection which continues to propagate through the fiber, again reflecting from interface 42 in a manner similar to that by which ray 46 is reflected. Reflection of ray 46 from interface 42 also produces a redirection of reflected light at all angles to the incident ray. The diffuse nature of this reflected component has been depicted by a plurality of dotted line arrows. The light intensity resulting from this latter mentioned reflected component conforms with Lambert's cosine law. Rays 46 and 48 and that reflected light represented by the dashed line arrows all contribute to the activation or darkening of photochromic glass core 38.

Light rays such as ray 52 enter the fiber and are incident upon the interface 42 at an angle less than the critical angle of reflection of that interface, and some of that light will be diffusely reflected as indicated by a plurality of dotted line arrows extending from that point where arrow 52 intersects interface 42. Some of this light which is incident upon interface 42 at an angle less than the critical angle may pass through layer 42 and some may be absorbed thereby, especially if layer 40 also contains some ultraviolet absorbing constituent. Layer 40 of dense opal glass will thus act, mostly by scattering of light, to reduce the amount of light leaking to adjacent fibers, and some of the scattered light will be returned to the fiber from which it originated, thus contributing additionally to the activation of the photochromic glass contained in that fiber.

In some fiber optic devices such as image transfer devices, wherein most of the light within the acceptance angle of a fiber should be transmitted the length of the fiber by the process of total internal reflection, fibers constructed in accordance with the present invention may not be desirable. However, the scattering of light back into the core is especially useful in image storage plates since ultraviolet light can contribute to the activation of the photochromic glass cores in such devices regardless of the direction of propagation of such ultraviolet light.

As discussed in conjunction with FIG. 1, a collimated light beam of green probing light is directed toward face 34 of plate 16 in a direction substantially perpendicular thereto. In FIG. 2 probing light ray 56 is shown entering a fiber core parallel to the axis thereof. The photochromic core material attenuates ray 56 if that core had previously been darkened by ultraviolet light. However, ray 56 could propagate through such a core, reflect from dichroic coating 22 and emanate from face 34 relatively unattenuated if the photochromic material were not darkened. Much of the probing light would emanate from face 34 even if ray 56 were slightly non-parallel to the fiber axis and were caused to reflect from interface 42.

I claim:

1. An image storage device comprising a multiplicity of light conducting fibers secured together in side-by-side relation to form a fiber optic plate, corresponding ends of said fibers cooperating to define first and second end faces, each of said fibers comprising a photochromic glass core having a given index of refraction and a cladding layer of dense opal glass disposed upon the surface of said core, said cladding layer having a refractive index lower than that of said core and forming with said core a light reflecting interface of such a character that light from said core incident upon said interface at angles greater than the critical angle produces a component of specular reflection and a component of light which scatters in said core at all directions, and light from said core impinging upon said interface at angles less than the critical angle results in a scattered light component whereby light is redirected at all angles into said core.

2. An image storage device in accordance with claim 1 wherein said cladding means includes an ultraviolet absorbing constituent.

3. An image storage device in accordance with claim 2 further comprising a cathode ray tube having a faceplate, said first end face being disposed adjacent to said faceplate.

4. An image storage device in accordance with claim 3 further comprising a dichroic coating disposed on said second end face, said dichroic coating being capable of reflecting green light and transmitting ultraviolet light, and a layer of phosphor disposed upon the surface of said dichroic coating, said phosphor being of the type which generates ultraviolet light.

5. An image storage device in accordance with claim 4 further comprising means for directing a beam of green light toward said first end face in a direction substantially perpendicular thereto.

6. An image storage device in accordance with claim 5 further comprising means for erasing information stored in said image storage plate.

7. An image storage device comprising a multiplicity of light conducting fibers secured together in side-by-side relation to form a fiber optic plate, corresponding ends of said fibers cooperating to define first and second end faces, each of said fibers comprising a photochromic glass core and a single cladding of dense opal glass having an index of refraction lower than that of said core, the core and cladding of each of said fibers forming a light reflecting interface.

8. An image storage device in accordance with claim 7 wherein said cores consist of a photochromic glass which is activated by ultraviolet light, said device further comprising a dichroic coating disposed on said second end face, said dichroic coating being capable of reflecting green light and transmitting ultraviolet light, and a layer of phosphor disposed upon the surface of said dichroic coating, said phosphor being of the type which generates ultraviolet light.

* * * * *